(12) United States Patent
Chow et al.

(10) Patent No.: US 11,081,893 B2
(45) Date of Patent: Aug. 3, 2021

(54) REMOVABLE HIGH VOLTAGE BATTERY COMPONENTS

(71) Applicant: TOYOTA MOTOR ENGINEERING & MANUFACTURING NORTH AMERICA, INC., Plano, TX (US)

(72) Inventors: Justin J. Chow, Los Angeles, CA (US); Joshua D. Payne, Ann Arbor, MI (US); Nathan C. Westover, New Hudson, MI (US); Robert C. MacArthur, Ypsilanti, MI (US); Shannon Alicia Wrobel, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 199 days.

(21) Appl. No.: 16/429,399

(22) Filed: Jun. 3, 2019

(65) Prior Publication Data
US 2020/0381923 A1    Dec. 3, 2020

(51) Int. Cl.
| | |
|---|---|
| *H02J 7/00* | (2006.01) |
| *H01M 10/46* | (2006.01) |
| *H01M 10/42* | (2006.01) |
| *B60L 53/60* | (2019.01) |
| *B60L 58/10* | (2019.01) |

(Continued)

(52) U.S. Cl.
CPC ............ *H02J 7/0013* (2013.01); *B60L 50/66* (2019.02); *B60L 53/60* (2019.02); *B60L 58/10* (2019.02); *H01M 10/425* (2013.01); *H01M 10/46* (2013.01); *H01M 50/20* (2021.01); *B60L 2210/00* (2013.01); *H01M 2010/4278* (2013.01); *H01M 2220/20* (2013.01)

(58) Field of Classification Search
CPC ...... H02J 7/0013; H01M 50/20; H01M 10/46; H01M 10/425; H01M 2220/20; H01M 2010/4278; B60L 53/60; B60L 58/10; B60L 50/66; B60L 2210/00
USPC ........................................................ 320/107
See application file for complete search history.

(56) References Cited

U.S. PATENT DOCUMENTS 4,760,597 A *  7/1988  Hayes ...................... H04N 7/16
                                                          348/E7.054
6,356,823 B1 *  3/2002  Iannotti ............. H04L 12/40032
                                                          369/21

(Continued)

FOREIGN PATENT DOCUMENTS

| WO | WO-2010033076 A1 * | 3/2010 | ............ H02J 7/0013 |
|---|---|---|---|
| WO | 2018128703 A2 | 7/2018 | |
| WO | 2018138424 A1 | 8/2018 | |

*Primary Examiner* — M Baye Diao
(74) *Attorney, Agent, or Firm* — Haynes and Boone, LLP

(57) ABSTRACT

A removable vehicle battery system includes an energy storage module, a charging/discharging control unit, converter configured to convert the energy into a usable format for an external device, and a power outlet configured to supply energy to the external device. The system communicates with the external device regarding the energy formats the external device requires as well as the quantity of energy in the energy storage module, and the formats in which the energy storage module can supply this energy to the external device. The control unit controls energy delivery from the energy storage module to the external device.

20 Claims, 7 Drawing Sheets

(51) Int. Cl.
*B60L 50/60* (2019.01)
*H01M 50/20* (2021.01)

(56) References Cited

U.S. PATENT DOCUMENTS

| | | | | |
|---|---|---|---|---|
| 7,520,355 | B2 * | 4/2009 | Chaney | B60K 6/405 |
| | | | | 180/68.5 |
| 7,838,142 | B2 * | 11/2010 | Scheucher | H01M 50/20 |
| | | | | 429/99 |
| 7,889,524 | B2 * | 2/2011 | Lee | B60L 53/22 |
| | | | | 363/65 |
| 8,026,698 | B2 * | 9/2011 | Scheucher | H02J 7/0027 |
| | | | | 320/136 |
| 8,816,534 | B1 | 8/2014 | Vasquez | |
| 8,872,474 | B2 * | 10/2014 | Scheucher | H01M 50/20 |
| | | | | 320/112 |
| 9,954,391 | B2 * | 4/2018 | Lei | H02J 9/04 |
| 10,098,278 | B2 | 10/2018 | Velderman et al. | |
| 10,467,827 | B2 * | 11/2019 | Taylor | G07C 5/00 |
| 10,483,773 | B2 * | 11/2019 | Hijazi | H02J 7/022 |
| 10,933,749 | B2 * | 3/2021 | Gaither | B60R 16/033 |
| 2013/0020993 | A1 * | 1/2013 | Taddeo | B60L 53/16 |
| | | | | 320/109 |
| 2018/0134172 | A1 | 5/2018 | Wallace et al. | |

\* cited by examiner

REMOVABLE HIGH VOLTAGE BATTERY COMPONENTS

TECHNICAL FIELD

The subject matter described herein relates generally to electric vehicle traction batteries and, more particularly, to apparatus, systems, and methods for employing vehicle traction batteries in power applications and devices outside the vehicle. These systems have particular but not exclusive utility for consumer and commercial electric vehicles, hybrid vehicles, and plug-in hybrid vehicles.

BACKGROUND

Electric, hybrid, and plug-in hybrid vehicles rely on large capacity traction batteries to operate electric traction motors. Such batteries may be fully or substantially charged by an external charging station, or may be incrementally or continuously charged by the vehicle itself, for example by an internal combustion engine, through regenerative braking, through photovoltaic panels on the surface of the vehicle, or by other means. These traction batteries represent a substantial store of electrical energy, and the vehicle is a convenient means for transporting this energy from one location to another.

Some vehicles include removable vehicle accessories, e.g., pumps, lights, etc., for use outside the vehicle. Some vehicles include power ports and sockets for powering external devices. The usefulness of vehicle traction batteries is greatly enhanced where they can be used to power external devices (e.g., through a 12 VDC automotive power plug, 5 VDC USB port, or 120 VAC inverter and household wall socket). However, power ports inside the vehicle may be difficult or inconvenient to access using normal power cords, adapter cords, or extension cords. Moreover, users and external devices generally have little or no information regarding the quantity and types of electrical power that are available (e.g., the maximum safe current or power output available from a given plug or port), and vehicle power systems have little or no information about the electrical loads attached to them (e.g., maximum expected startup current, stall current, or steady-state current of a device). This lack of information can lead to electrical problems including but not limited to blown fuses, overcurrent or overvoltage damage, or damage due to undercurrent, undervoltage, or brownout. Accordingly, needs exist for vehicle power storage and management apparatus, systems, and methods, that address the forgoing and other concerns.

The information included in this Background section of the specification is included for technical reference purposes only and is not to be regarded as subject matter by which the scope of the disclosure is to be bound.

SUMMARY

Disclosed are apparatus, systems, and methods for electric vehicle traction batteries that may operate at high voltage and can be removed from the vehicle and used for other applications, hereinafter referred to as a removable vehicle battery system.

One general aspect includes a removable vehicle battery system including: an energy storage device configured to power a first vehicle, the energy storage device including a first removable energy storage module including a store of energy. The removable vehicle battery system also includes a control unit configured to control charging and discharging of the first removable energy storage module, a removable converter configured to convert the store of energy into a usable format for an external device, a power outlet configured to supply energy from the store of energy to the external device in the usable format when the first removable energy storage module is removed from the first vehicle, a communication link between the external device and at least one of the first removable energy storage module, the removable converter, and the control unit, wherein the communication link is configured to receive information from the external device regarding the usable format, and to communicate information regarding the store of energy and the usable format to the control unit. In response to receiving information regarding the store of energy and the usable format, the control unit controls energy delivery to the external device.

Other embodiments of this aspect include corresponding controller systems, apparatus, and procedures recorded on one or more controller-accessible storage devices, each configured to perform the actions of the methods. A system of one or more controllers can be configured to perform particular operations or actions by virtue of having software, firmware, hardware, procedures, or a combination thereof installed on the system that in operation causes or cause the system to perform the actions. One or more controller procedures can be configured to perform particular operations or actions by virtue of including instructions that, when executed by processing apparatus, cause the apparatus to perform the actions.

Implementations may include one or more of the following features. The system where the communication link is a wireless link including a direct, indirect, or ad-hoc wireless link. The system where the wireless link is configured to pass through an external router, server, or network. The system where the control unit is further configured to: verify whether an arrangement of the first removable energy storage module and the removable converter can deliver the store of energy to the external device in the usable format, instruct a user as to alternative configurations of the first removable energy storage module, removable converter, and a second removable energy storage module that are capable of delivering the store of energy to the external device in the usable format, and command internal switching between different connection types between the first removable energy storage module, second removable energy storage module, and removable converter. The system where the communication link is a wired link. The system where the removable energy storage module includes the removable converter. The system where the removable converter is separate from but connectable to the removable energy storage module. The system where the information regarding the store of energy includes one or more of a quantity of energy, a maximum available current, a maximum available power, or a range of available voltages. The system where the information regarding the usable format includes a at least one of a voltage requirement, a current requirement, or a power requirement. The system where the power outlet is configured to supply DC power, where the system establishes communication with the external device to specify a voltage range to be applied through identified positive and negative DC terminals. The system where the DC power includes at least one of 5-volt or 12-volt DC power. The system where the power outlet is configured to supply AC power. The system where the ac power includes at least one of 120-volt or 220-volt AC power. The system where the ac power includes at least one of single-phase or three-phase AC power. The system where the control unit controls the discharging of the removable energy storage module through wireless communication. The system where the external device includes any of a second vehicle, a building, a tool, or an appliance. The system where the external device includes a plurality of tools or appliances. The system where at the first energy storage module includes a voltage of between 50 and 425 volts. Implementations of the described techniques may include hardware, a method or process, or controller instructions on a controller-accessible medium.

Another general aspect includes a method of powering an external device with a vehicle battery, including: subdividing the vehicle battery into one or more removable power modules and one or more converters, configuring the one or more converters to convert energy stored in the one or more removable power modules into a format usable by the external device, providing a communication link between the external device and at least one of the one or more converters or at least one of the one or more removable power modules, and communicating information between the external device and at least one of the one or more converters or at least one of the one or more removable power modules. The method of powering also includes, in response to the communication, supplying energy to the external device in the format usable by the external device based on whether the energy can be supplied in the format usable by the external device. Other embodiments of this aspect include corresponding controllers, apparatus, and instructions recorded on one or more controller-accessible storage devices, each configured to perform the actions of the methods.

Another general aspect includes a removable vehicle battery system including: one or more removable energy storage modules configured to power a vehicle, each including a store of energy, and one or more converters disposed within or connectable to the one or more removable energy storage modules, the converters being configured to convert one or more of the stores of energy into a format usable by an external device. The removable vehicle battery system also includes one or more power outlets disposed on the converters, the power outlets being configured to supply energy to the external device. The removable vehicle battery system also includes a wireless communication link between the external device and one or more of the removable energy storage modules, wherein the one or more removable energy storage modules and one or more converters may be removed from the vehicle and used to power the external device, wherein the wireless communication link is configured to communicate information from regarding the store of energy and the format usable by the external device, and wherein the one or more removable energy storage modules and one or more converters provide energy to the external device based on whether the store of energy can be provided in the format usable by the external device. Other embodiments of this aspect include corresponding controllers, apparatus, and instructions recorded on one or more controller-accessible storage devices, each configured to perform the actions of the methods.

The removable vehicle battery system disclosed herein has particular, but not exclusive, utility for consumer and commercial electric vehicles and plug-in hybrid vehicles.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the method, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
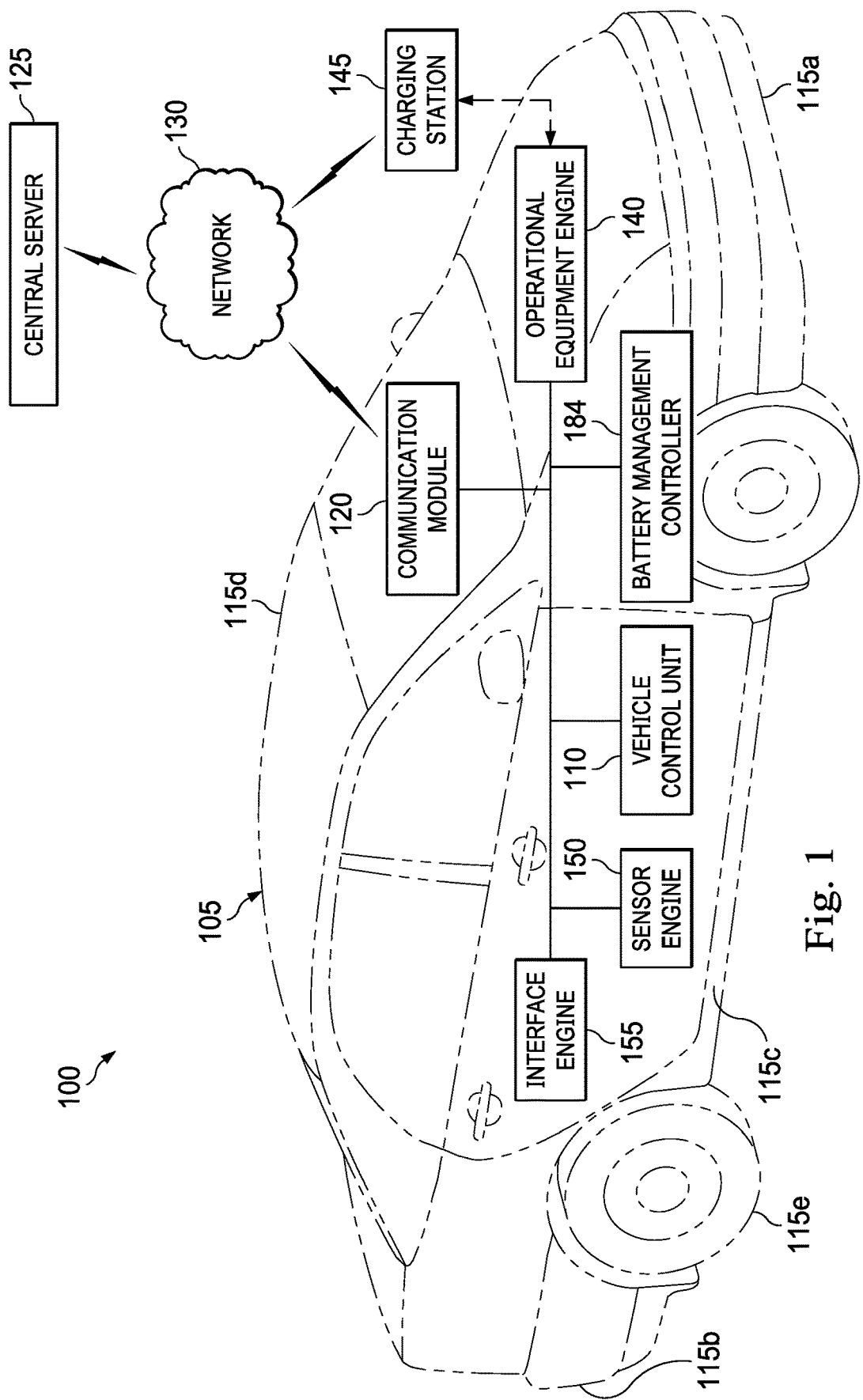
FIG. 1 is a diagrammatic illustration of a removable vehicle battery system operable to charge and discharge a vehicle battery, according in accordance with at least one embodiment of the present disclosure.

Disclosed are high voltage electric vehicle traction batteries that can be removed from the vehicle and used for other applications. With the disclosed system, the traction battery, or portions thereof, can be detached from the vehicle and configured to work with smart tools or other smart devices, e.g., at a job site, in the home, etc.

The disclosed system, referred to as a removable vehicle battery system, includes an electrified vehicle with a high voltage traction battery (i.e., propulsion battery) with a voltage greater than 60 V, and typically in the range of 250-400 V. The traction battery includes a plurality of battery modules that are removable. This traction battery can be readily removed from the vehicle in separate battery modules and used to power other devices that are not necessarily associated with the vehicle. For example, the battery modules may be used to power or recharge tools, or may be used as a source of electrical power for a home, campsite, or job site. This ability to subdivide the battery into separate modules provides a lower voltage, lower power, lower mass/volume solution instead of using a single whole traction battery. This also permits the remaining battery modules to provide propulsion power to the vehicle rather than leaving the vehicle disabled.

When the entire traction battery is removed, or when a sufficient number of battery modules are removed to render the vehicle incapable of propulsion, the battery management controller (BMC), contactors, pre-charge resistor, etc. may be removed with the batteries to make the removable power setup a standalone system. Otherwise, the controller, contactor, pre-charge resistor, etc. would stay with the vehicle, and the removed battery modules would be controlled via the BMC onboard the vehicle, or from a cloud server. For safety reasons and to prevent damage to the battery modules, each battery module may include a switching device (fuse, circuit breaker, on/off switch, etc.) to prevent inadvertent discharge or shorting of modules that are not accompanied by contactors (i.e., with nothing plugged into them). The switching device is configured to communicate with the BMC onboard the vehicle. The battery modules may also include sensors, e.g., voltage, current, and temperature sensors.

The battery modules may be configured to communicate with smart devices, such as smart tools. The battery modules and associated removable DC/DC converter and/or DC/AC inverter from the vehicle may regulate the voltage level and voltage type to the smart device while in communication with the device. The traction battery and associated modules working in conjunction with the removable converter and inverter may thus provide AC and DC power at variable voltages. The AC voltages may be single or three phase. Once the battery modules, inverters, converters, and associated equipment are finished with the external use, they can be readily reinstalled back into the vehicle.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes and should not be considered to limit the scope of the removable vehicle battery system. Certain features may be added, removed, or modified without departing from the spirit of the claimed subject matter.

FIG. 1 is a diagrammatic illustration of a removable vehicle battery system operable to charge and discharge a vehicle battery, in accordance with at least one embodiment of the present disclosure. In this example, a removable vehicle battery system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 is operably coupled to, and adapted to be in communication with, the vehicle control unit 110. The communication module 120 is adapted to communicate wirelessly with a central server 125 via a network 130 (e.g., a cellular network such as 3G network, a 4G network, a 5G network, or a short-range network such as a Wi-Fi network, Bluetooth or the like). The central server 125 may provide information and services including but not limited to include location, mapping, route or path, and topography information.

An operational equipment engine 140 is operably coupled to, and adapted to be in communication with, the vehicle control unit 110. The operational equipment engine 140 is connectable to a charging station 145, as will be described in further detail below. A sensor engine 150 is operably coupled to, and adapted to be in communication with, the vehicle control unit 110. The sensor engine 150 is adapted to monitor various components of, for example, the operational equipment engine 140, as will be described in further detail below. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the removable vehicle battery system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, the central server 125, and the charging station 145.

The vehicle 105 also includes a battery management controller (BMC) 184, the operation and uses of which will be described below. A reader of ordinary skill in the art will understand that other components or arrangements of components may be found in an electric vehicle (EV), hybrid vehicle, or plug-in hybrid vehicle.

Figure 2:
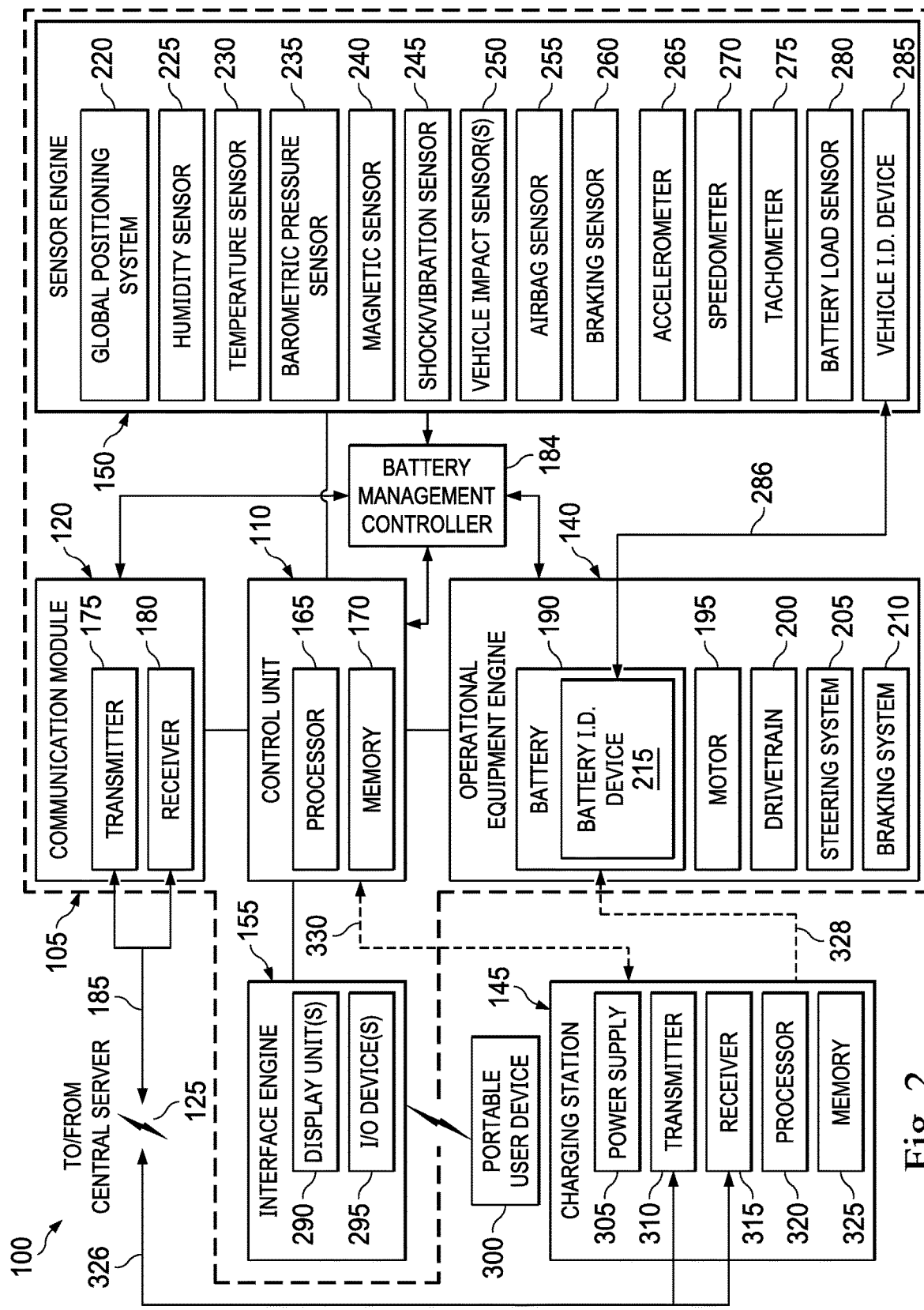
FIG. 2 is a diagrammatic illustration in a block-diagram form of at least a portion of the removable vehicle battery system of FIG. 1, in accordance with at least one embodiment of the present disclosure.

FIG. 2 is a diagrammatic illustration in a block-diagram form of at least a portion of the removable vehicle battery system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. The vehicle battery 190 is an energy storage device configured to power the vehicle 105. In an EV, hybrid, or plug-in hybrid vehicle, the battery 190 provides electrical power to the motor 195 to drive the wheels 115e of the vehicle 105 via the drivetrain 200. In some examples, in addition to providing power to the motor 195 to drive the wheels 115e of the vehicle 105 via the drivetrain 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a humidity sensor 225, a temperature sensor 230, a barometric pressure sensor 235, a magnetic sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, or any combination thereof. The sensors or other detection devices may be configured to sense or detect activity, conditions, and circumstances in an area to which the device has access, e.g., ambient conditions or conditions within a battery compartment. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., a USB port or the Bluetooth communication interface). In an example, the portable user device 300 is a handheld or otherwise portable device which is carried into or near the vehicle 105 by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, dashboard cameras, and/or any other suitable devices. In several examples, the portable user device 300 is a smartphone such as, for example, an iPhone® by Apple Incorporated.

In some examples, the charging station 145 includes a power supply 305, a transmitter 310, a receiver 315, a processor 320, and a memory 325. In some examples, one or the other of the transmitter 310 and the receiver 315 may be omitted according to the particular application for which the charging station 145 is to be used. In some examples, the transmitter 310 and the receiver 315 are combined into a transceiver capable of both sending and receiving wireless signals. The charging station 145 is adapted to recharge the vehicle battery 190, as indicated by arrow 328. In some examples, before, during, and/or after the recharging of the battery by the charging station 145, the charging station 145 is further adapted to send and/or receive data to and/or from the vehicle control unit 110, as indicated by arrow 330.

The vehicle 105 also includes a battery management controller (BMC) 184, to regulate charging and discharging of the battery 190 and energy delivery from the battery 190 in order to maximize the responsiveness and energy efficiency of the vehicle 105 (e.g., by supplying the correct amount of energy to the motor 195 at any given time), to maximize lifespan and energy storage capacity of the battery 190, and to prevent damage to any vehicle systems or subsystems related to charging or discharging of the battery 190. In some vehicles, the battery 190 or battery management controller (BMC) 184 or battery management system (BMS) 184 may include thermal management systems including but not limited to fans, radiators, liquid coolant systems, pumps, heaters, and thermoelectric heating/cooling junctions, and temperature sensors on the battery 190 or on terminals or cables connected to the battery. In such cases, monitoring and management of battery temperature may also be a function of the BMC 184, which may be capable of activating battery heating or cooling systems when battery temperature and other conditions make this advisable.

A reader of ordinary skill in the art will understand that other components or arrangements of components may be found in an EV, hybrid vehicle, or plug-in hybrid vehicle.

Figure 3:
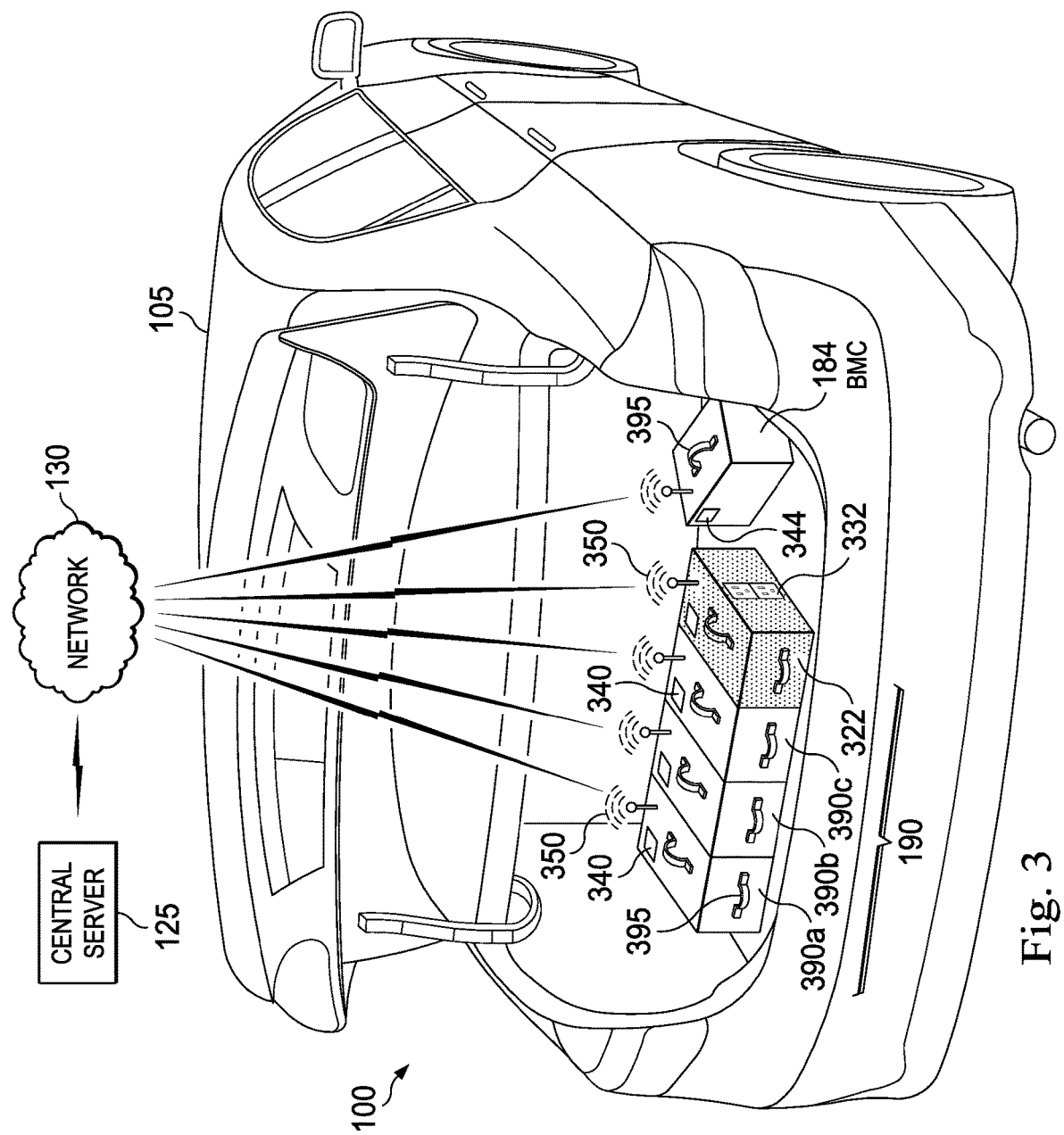
FIG. 3 is a diagrammatic illustration indicating the basic removable/relocatable elements of the removable vehicle battery system.

FIG. 3 is a diagrammatic illustration indicating the basic removable/relocatable elements of the removable vehicle battery system 100. The vehicle battery 190 as shown in FIG. 2 comprises battery modules or energy storage modules 390 disposed within the vehicle 105. In the example shown in FIG. 3, there are three battery modules 390*a*, 390*b*, and 390*c*, although other numbers of battery modules could be used. When the battery modules 390 are combined into a battery 190, their available voltage and/or amperage may be increased such that, for example, a series connection of three 100 VDC battery modules 390 with 200 amp current capacity may produce a 300 VDC battery with 200 amp (60 kW DC) capacity, whereas a parallel connection of the same battery modules 390 may yield a 100 VDC battery with a 600 amp (60 kW DC) capacity. In some embodiments, the battery modules 390 each comprise a microprocessor 340, wireless transceiver 350, and one or more handles 395 which enable the battery modules 390 to be lifted in and out of the vehicle 105.

The battery 190 also comprises one or more converters 322. The converter 322 converts or inverts the available battery voltage (e.g., 300 VDC) into a demand voltage as described below. In an example, this demand voltage may be employed by the vehicle traction motors. In some embodiments, the converter 322 may also convert voltages flowing back into the battery 190 (e.g., from regenerative braking), such that an available voltage flowing from vehicle systems is converted into a demand voltage suitable for recharging the battery modules 390. In some embodiments, the converter 322 also comprises a power outlet 332, microprocessor 340, wireless transceiver 350, and one or more handles 395.

The removable vehicle battery system 100 further comprises a battery management controller (BMC) 184. The BMC 184 regulates the charging and discharging of the battery 190. The BMC 184 may read voltages from the battery 190 or battery modules 390. The BMC 184 may also read data from sensors including but not limited to a temperature sensor 230, battery load sensor or (e.g., voltmeter or ammeter) 280, or braking sensor 260. In some embodiments, the BMC 184 comprises a battery management processor 344, wireless transceiver 350, and one or more handles 395. In order to regulate battery charging and discharging, the BMC 184 is capable of issuing instructions to or otherwise affecting the behavior of the battery modules 390, the converter 322, or the VCU 110.

In some embodiments, the BMC 184, battery modules 390, converter 322, and VCU 110 communicate through wired electrical pathways within the vehicle 105 (e.g., serial protocols including but not limited to RS-232, RS-485, CAN, Ethernet, ARINC 429, MODBUS, MIL-STD-1553, or parallel protocols including but not limited to ATA, SCSI, PCI, IEEE-488, and IEEE-1284). In other embodiments, the BMC 184, battery modules 390, and converter 322 communicate through wireless communication links (e.g., wireless protocols including but not limited to Bluetooth, Wi-Fi, Zigbee, Li-Fi, or cellular data connections such as 2G/GSM, 3G/UMTS, 4G/LTE/WiMax, or 5G). In some embodiments, at least one of the battery modules 390, the converter 322, and the BMC 184 communicate via the network 130 with a remote server or cloud server 125. This communication may be facilitated by the communication module 120, or may be directly through one or more wireless transceivers 350. In other embodiments, wireless communication takes place directly between components (e.g., via an ad-hoc wireless link or network), or via a local network (e.g., using an external router).

One or more battery modules 390 may be removed from the vehicle to power other devices, including smart tools, smart buildings, and other vehicles. In some embodiments, the converter 322 and/or BMC 184 are also removable. In some embodiments, the vehicle may be disabled when the inverter and/or the converter are removed, or when battery modules are removed such that the available voltage or wattage falls below a threshold value. In other embodiments, one or more aspects of the vehicle may continue to operate by means of secondary batteries, controllers, or converters, or through power provided by an internal combustion engine or other power source (e.g., photovoltaic panels). The diagram of FIG. 3 is shown for exemplary purposes, and does not limit the matter claimed by the present disclosure.

Figure 4:
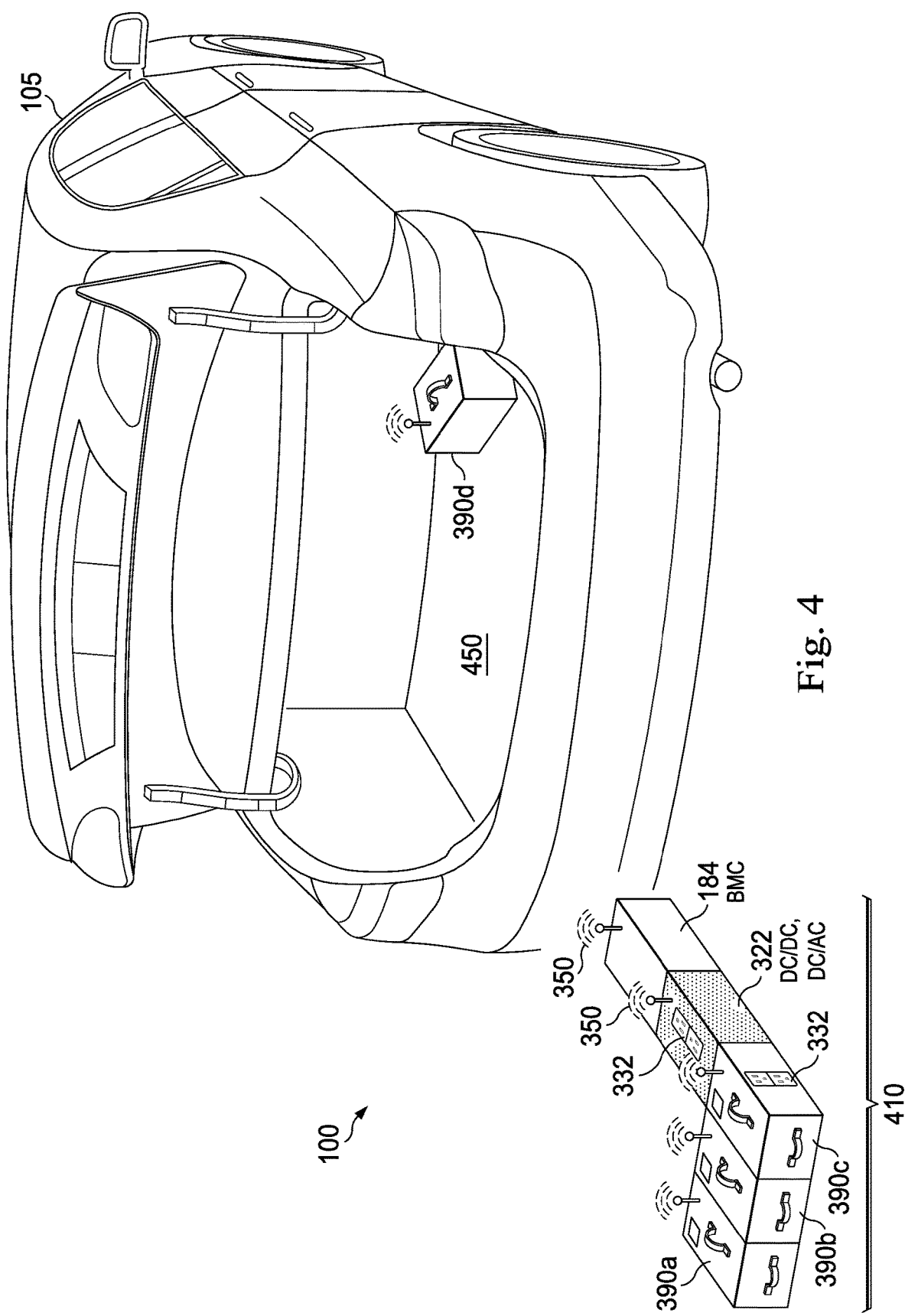
FIG. 4 is an exemplary diagrammatic illustration of the removable vehicle battery system 100 in accordance with at least one embodiment of the present disclosure.

FIG. 4 is an exemplary diagrammatic illustration of the removable vehicle battery system 100 in accordance with at least one embodiment of the present disclosure. In this implementation, for clarity, only certain components are shown. In the example shown, within the vehicle 105 is a battery compartment 450, with one battery module 390d disposed therein. The BMC 184, converter 322, and battery modules 390a, 390b, and 390c have all been removed and sit temporarily outside the vehicle 105. In some embodiments, the vehicle is capable of operating in this configuration, although the output voltage and battery charging/discharging characteristics may not be well controlled.

Together the battery modules 390a, 390b, and 390c, along with the converter 322, form an external power pack 410. In some embodiments, the BMC 184 may also be a part of the external power pack 410. In other embodiments, the external power pack 410 communicates wirelessly with the BMC 184, or with the communication module 120 of the vehicle 105, which communicates with the BMC 184 through a wired connection, or through a wireless connection supported by wireless transceivers 350. In still other embodiments, the external power pack 410 does not need a BMC 184 in order to function, as the converter 322 or battery modules 390 are able to communicate directly with smart tools or other smart systems.

In some embodiments, the converter 322 includes a power socket 332. In other embodiments, one or more of the battery modules 390a, 390b, or 390c are battery/inverter or battery/converter modules that are able to convert stored electrical energy into a usable form, and include a power socket 332 of their own.

It is noted that higher voltage systems tend in general to be more energy efficient, as they run at lower currents and thus tend to dissipate less energy as heat. However, it is also noted that inverters and DC-DC converters required to step down high voltages (e.g., 300-400 VDC) into lower voltages (e.g., 5 VDC, 12 VDC, or 120 VAC) tend to be larger and more expensive than inverters and DC-DC converters required to step down moderate voltages (e.g., the 48 VDC used by many "mild hybrid" vehicles). Thus, a modular system wherein a vehicle battery 190 comprises a plurality of smaller removable battery modules 390 may allow the vehicle to operate efficiently at high voltage, while allowing the smaller removable battery modules to operate at lower voltages which allow the converter or converters 322 to be smaller. For this reason, it may be advantageous to connect the battery modules in series while they are in the vehicle and in parallel while they are being used external to the vehicle to power external devices. In some embodiments, the physical connection between the battery modules 190 is the same in both cases, but the electrical routing between battery modules 190 (e.g., series vs. parallel) is controlled by commands from the BMC 184. In some embodiments, the removable battery system 100 is capable of interfacing with external devices incorporating new AC standards or new DC standards (e.g., low-voltage DC standards). When establishing a power connection (e.g., a DC power connection), the system (e.g., the BMC 184) establishes communication, identifies which terminals of an appropriate connector will serve as positive and negative, and specifies a voltage range to be delivered to the external device.

Figure 5:
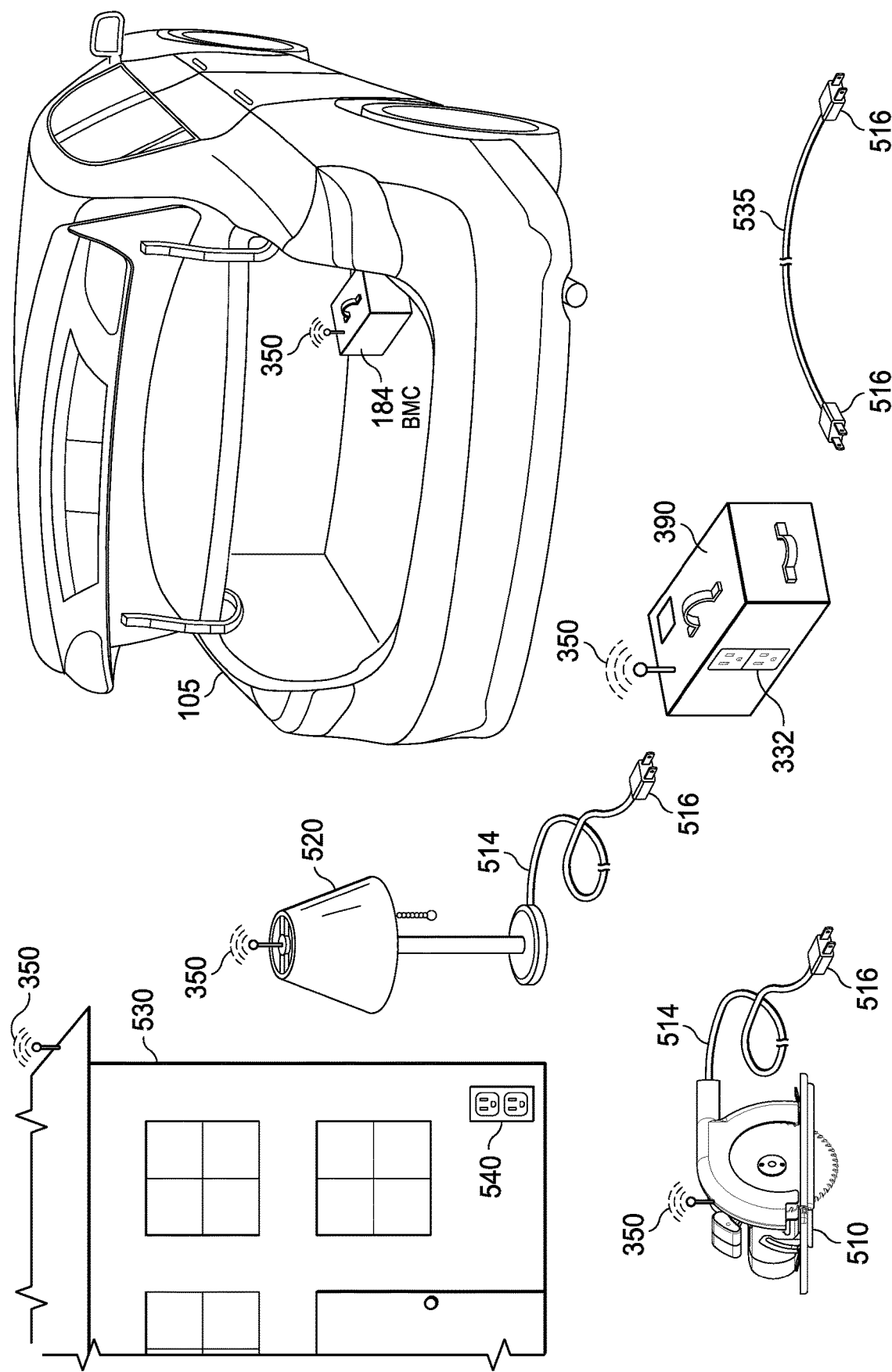
FIG. 5 is an exemplary diagrammatic illustration of the removable vehicle battery system 100 in accordance with at least one embodiment of the present disclosure.

FIG. 5 is an exemplary diagrammatic illustration of the removable vehicle battery system 100 in accordance with at least one embodiment of the present disclosure. In the example shown, a battery/inverter module 390 includes an electrical outlet 332 that is capable of powering smart power tools 510 and smart home appliances 520 (e.g., using 120 VAC current). Each power tool 510 or appliance 520 includes a power cord 514 and power plug 516, to which the electrical outlet 332 of a battery module 390 or converter 322 are configured to connect. An extension cord 535 (e.g., a double-ended extension cord with two male connectors 516) may be used to connect the electrical outlet 332 of a battery/inverter module 390 or converter 322 to an electrical outlet 332 or transfer switch outlet 540 of a building 530 (e.g., a house) to supply power (e.g., 120 VAC) power to the building 530.

Many power tools (e.g., circular saws, sanders, air compressors) and power appliances (e.g., refrigerators, blowers, garage door openers) draw several kilowatts of power for brief periods during startup, despite requiring substantially less power during continuous operation. A battery and inverter capable of running an entire typical household at standard 120 VAC may need to deliver as much as 60-70 amps. A battery and inverter capable of operating single power tools or appliances at 120 VAC may need to deliver 10-40 amps for up to several seconds, and 10-15 amps continuously for extended periods. Other nonmechanical household devices such as electric lights, TV sets, laptops, and cell phone chargers do not require a startup current that is larger than their steady-state operational current. A battery and inverter capable of supplying two such devices simultaneously at 120 VAC need only be capable of supplying for example about 2.5 amps. Some buildings (e.g., homes and businesses in other countries), or individual appliances (e.g., electric ovens and clothes dryers), can be operated at 220 VAC and thus draw only half as much current as a 120 VAC device.

An advantage of battery modules 390, converters 322, or BMC 184 that are capable of communicating wirelessly with smart tools 510, smart appliances 520, smart buildings 530, or other smart devices is that they are able to request and receive information from the smart device. Such information may include, but is not limited to: device type, device ID, device status (e.g., healthy, stalled, damaged, etc.), registered owner, registered location, required operating voltage (including maximum safe tolerances), maximum expected peak current or power draw, maximum expected sustained current or power draw, current or power draw at which a safety shutoff is requested, and emergency shutoff requests (e.g., triggered by drop detection or other anomaly detection within the tool 510, appliance 520, building 530, or other smart device). Similarly, the battery module 390, converter 322, or BMC 184 are able to communicate information to the smart tool 510, smart appliance 520, smart building 530, or other smart device, such information including but not limited to available stored energy (e.g., in amp-hours), available output voltages and connector types, maximum available current draw, overtemperature warnings, low charge warnings, and estimated time remaining to charge depletion at present power draw levels.

Such information exchange may allow the removable vehicle battery system 100 to interface safely with the tools 510, appliances 520, buildings 530, or other smart devices, with reduced risk of equipment damage or operator injury. This system may also permit the removable vehicle battery system 100 to lock out or otherwise decline to operate tools that have been removed from their registered owners or locations, or to perform other functions related to the information exchange.

It is noted that battery modules 390 may be interchangeable and interoperable between vehicles, so that an uncharged battery 190 of one vehicle may be fully or partially interchanged with a charged battery 190 of another vehicle. In some embodiments, where wireless communication is not desirable, not feasible, or not working correctly, the power connection itself (i.e., the power cord 535 with power plug 516 connected to outlet 332 in a battery module 390 or converter 322) may be used as a wired link to exchange information (e.g., through standards such as Power Line Communication or Universal Powerline Bus) that would otherwise be carried wirelessly.

In some embodiments, the battery 190 or converter 322 may include thermal management systems including but not limited to fans, radiators, liquid coolant systems, pumps, heaters, and thermoelectric heating/cooling junctions, and temperature sensors on the battery 190 or on terminals or cables connected to the battery. Such systems may be monitored or controlled remotely by the BMC 184.

In an example, a smart tool 510 (e.g., a table saw) at a job site may require a higher peak current or peak power output than a single battery module 390 can provide. In this case, the battery module 390 might refuse to supply power to the smart tool 510. In such an instance, the battery management controller 184 may determine that (a) that two additional battery modules 510 are charged and available for use, for a total of three battery modules 510, and (b) that two of the three battery modules, connected in parallel, would be capable of providing the necessary current or power. In this case, the BMC 184 may instruct a user (e.g., via the Interface Engine 155 or portable user device 300) to connect two of the three battery modules 510 in an appropriate configuration, and/or the BMC 184 may further instruct the battery modules 510 to connect in a parallel rather than a series connection. The BMC 184 may then inform the user that one additional battery module is available to power devices operating below a specified wattage (e.g., 300 watts—enough to supply a 200-watt stereo receiver and a 100-watt lamp that are present at the same job site). The BMC 184 may also provide ongoing battery status to the user (e.g., via the Interface Engine 155 or portable user device 300), including warning messages when a battery module 390 drops below a threshold level of charge. This example is provided for illustrative purposes and should not be regarded as limiting.

Figure 6:
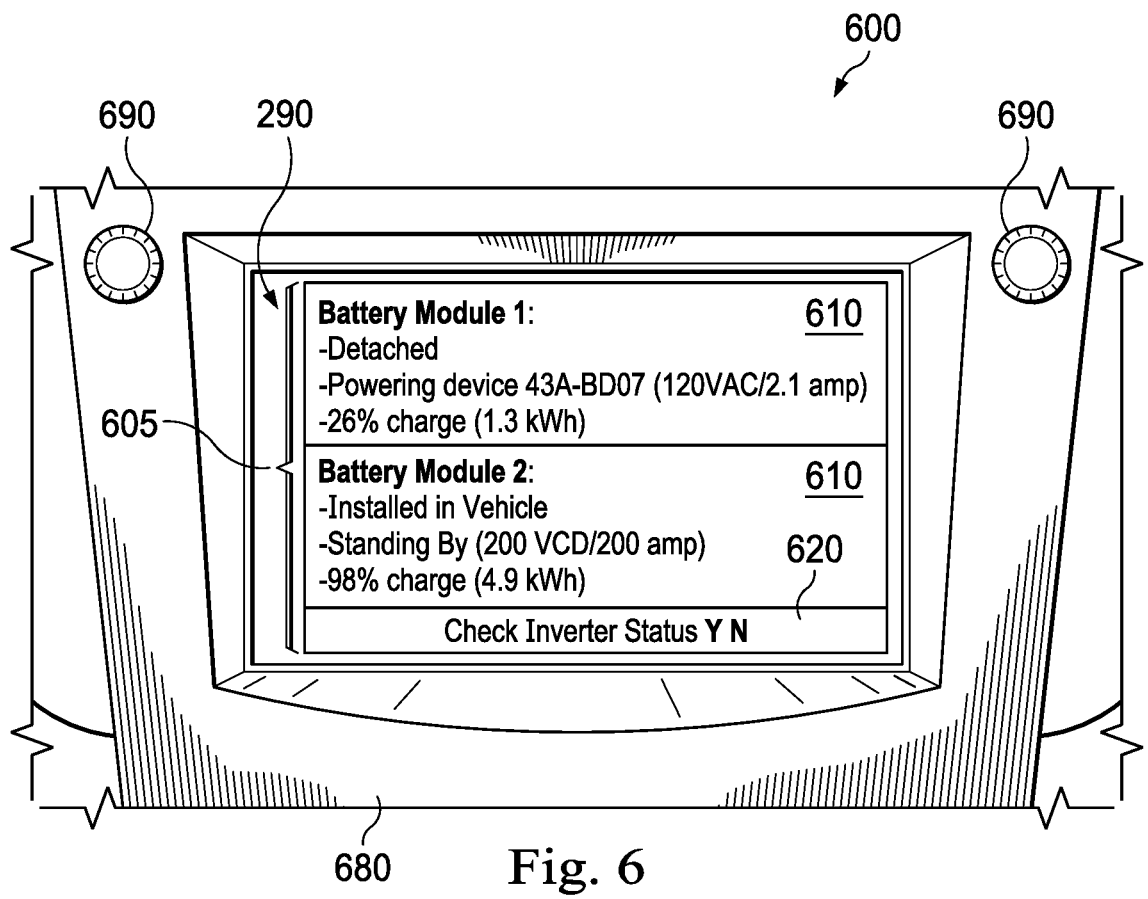
FIG. 6 is a diagrammatic illustration of an example user interface display or Human Machine Interface according to at least one embodiment of the present disclosure.

FIG. 6 is a diagrammatic illustration of an example user interface display or Human Machine Interface (HMI) 600 according to at least one embodiment of the present disclosure. It is noted that in many embodiments, the removable vehicle battery system 100 may operate automatically, with no user interaction. However, in other embodiments it may be desirable to communicate information to a user, or accept instructions from a user, or request information from a user, via the HMI 600.

The HMI 600 may be interactive, and may be facilitated for example through the dashboard Head Unit (HU) 680 or through a connected smartphone or other portable device 300 using an application program interface API. In the example shown in the figure, the HMI 600 includes a text-based interface 605 on the display unit 290 of the head unit 680. Also visible are control knobs 690. In some embodiments, the HMI 600 may be a portion of, be the same element as, or be in communication with the interface engine 155 or portable device 300.

In the example shown in the figure, the text-based interface 605 includes status windows 610 that report the current status of components such as battery modules 390, converter 322, and BMC 184. In some embodiments, the HMI 600 may also report the status of smart tools 510, smart appliances 520, smart buildings 530, or other smart devices. In some implementations, the text-based interface may also include user queries 620 that pose a question to the user and allow the user to respond. In some embodiments, such user queries 620 are limited to yes-or-no questions such as "Show Tool Status?" or "Show Battery Module Status?" In other embodiments, user queries 620 may solicit numerical information from the user such as the number of battery modules the user plans to remove from the vehicle. In still other embodiments, user queries may solicit more complex information to be interpreted by a virtual agent.

A person of ordinary skill in the art will appreciate that a variety of different interfaces may be employed to provide information to the user, to request information from the user, and to receive information from the user. It is also noted that in many examples no user interaction is required in order to perform the operations of the removable vehicle battery system.

Figure 7:
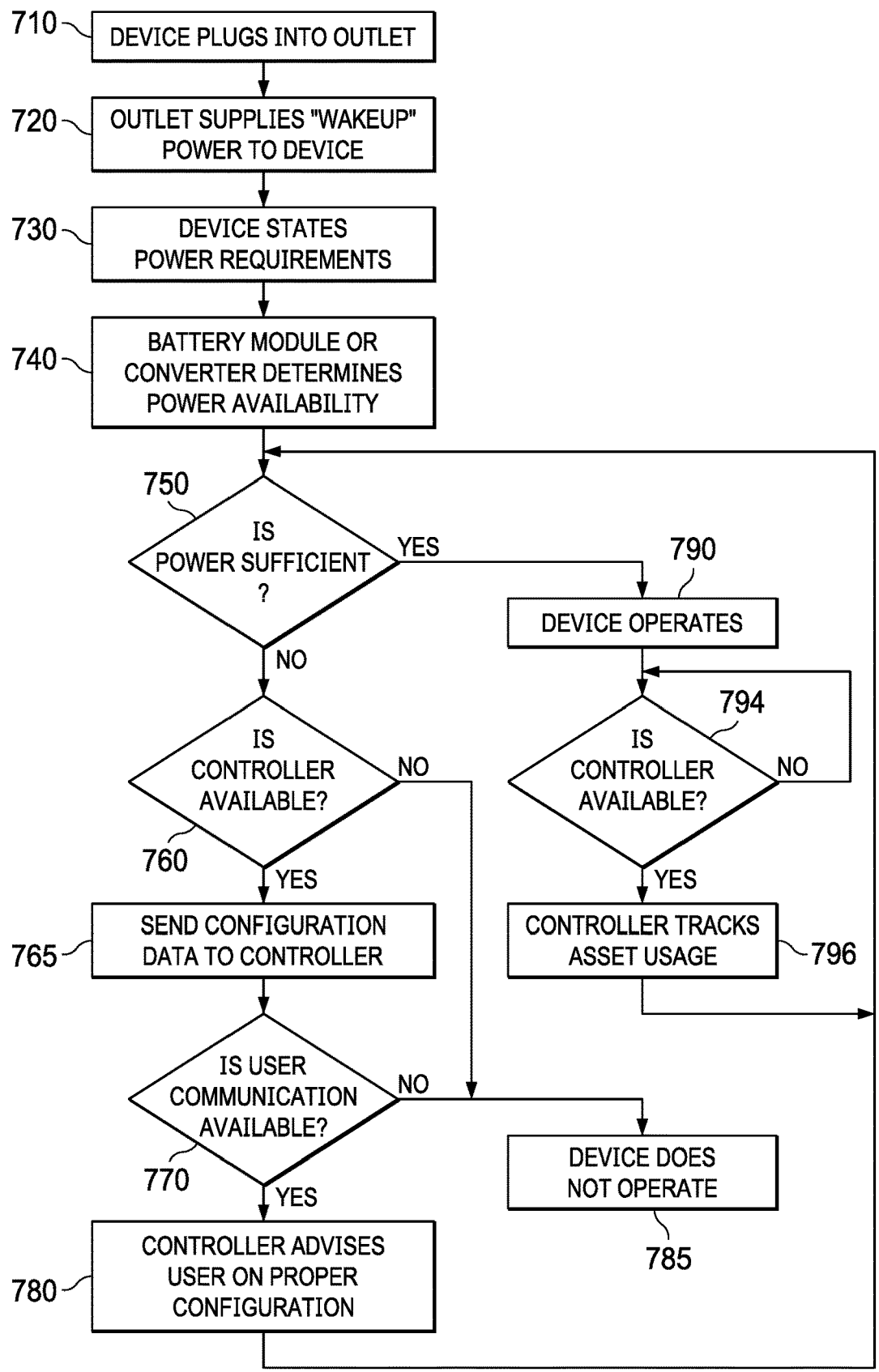
FIG. 7 is a flow diagram of an example implementation of the removable vehicle battery system according to at least one embodiment of the present disclosure.

FIG. 7 is a flow diagram of an example implementation of the removable vehicle battery system 100 according to at least one embodiment of the present disclosure. In step 710, a smart device (e.g., a smart tool 510, smart appliance 520, or smart building 530) is plugged into an outlet 332 via a plug 516 on a power cord 514. The outlet 332 may be situated on a battery module 390 or a converter 322.

In step 720, the outlet 332 supplies sufficient "wakeup" power to the smart device 510, 520, or 530 to enable it to send and receive information, including information regarding its power requirements. In an embodiment, the informant includes device identification information.

In step 730, the device 510, 520, or 530 sends information indicating its power requirements. These requirements may include connector type, expected voltage, maximum startup current or power, maximum sustained current or power, and maximum permitted current or power (e.g., due to an electrical short or motor stall) before an emergency shutoff is requested. This information may be sent to the battery module 510 or converter 390 as described above, or may be sent directly to the BMC 184.

In step 740, the battery module 390 or converter 322 determines its power availability. This information may include available voltages (or a range of available voltages), available connector types, a maximum available current or power, and total available stored energy (e.g., in kilowatt-hours). This information may be sent to the smart device 510, 520, or 530, or may be sent to the BMC, or else may be retained within a processor 340 of the battery module 390 or converter 322.

In step 750, the battery module 390 or converter 322 determines (e.g., via calculations within the processor 340), whether the power available within the battery module 390, or available through the converter 322, is sufficient to operate the smart device 510, 520, or 530. If the answer is yes, the available power is sufficient, then the process moves to step 790. If the answer is no, power is insufficient, then the process moves to step 760.

In step 760, the battery module 390 or converter 322 has determined that sufficient power is not available to operate the device. The battery module 390 or converter 322 then determines whether the battery management controller 184 is available for communication. This may be accomplished for example by the battery module 390 or converter 322 broadcasting a communication "ping" which is answered by an acknowledgment from the BMC 184, or by other appropriate signaling methods. If the answer is no, the BMC 184 is not available, then the process moves top step 785. If the answer is yes, the BMC 184 is available, then the process moves to step 765.

In step 765, the smart device 510, 520, or 530 communicates its power needs to the controller 184, such that the controller 184 is aware of information such as the connector types, voltage levels (e.g., 5V, 12V, 120V), voltage types (e.g., DC, single-phase AC, 3-Phase AC), peak current or power levels, and sustained current or power levels that the smart device 510, 520, or 530 requires or is capable of employing. Additionally, all available battery modules 390 and converters 322 send their configuration data to the controller 184, such that the controller 184 is aware of their charge status, available connector types, available voltage levels and voltage types, available peak current or power outputs, and available sustained current or power outputs.

In step 770, the BMC 184 determines whether it is currently possible to communicate with a user. This may be accomplished for example by sounding a notification chime and displaying a message via the HMI 600, to which the user responds for example by touching a button on the head unit 680, display 290, or portable user device 300. If the answer is no, user communication is not currently available then the process moves to step 785. If the answer is yes, user communication is available, then the process moves to step 780.

In step 780, the BMC 184 determines (e.g., via calculations within the BMC processor 344) a configuration of available battery modules 390, or converters 322 and battery modules 390, that will be capable of operating one or more of the smart device 510, 520, or 530 (e.g., by supplying sufficient current or power in an appropriate voltage level and type). This configuration may involve serial or parallel connection of two or more battery modules 390 and/or converters 322. In some embodiments, the BMC 184 also communicates details of the desired configuration to the battery modules 184 or converters 322, such that for example a reconfigurable connection is configured as a series or parallel connection as necessary. For example, if two battery modules 184 are already connected in series, and are incapable of powering a given smart device in that configuration, the BMC may command the battery modules 184 to reconfigure their connection as a parallel connection through internal switching, without any required user intervention. However, if user intervention is required, the BMC 184 then advises the user (e.g., via the HMI 600) on the determined configuration, such that the user has enough information to gather and connect the required battery modules 184 and, if necessary, converters 322. The process then moves to step 750, and the process continues looping from 750, through 760, 770, and 780 until the user has assembled the requested configuration of battery modules 390 or converters 322 and battery modules 390.

In step 785, it has been determined either that the BMC 184 is not available or that the user is not available for communication at this time. In this case, the outlet 332 does not supply operating power to the device 510, 520, or 530, and the device does not operate.

In step 790 it has been determined that sufficient power is available to operate one or more of the smart device 510, 520, or 530, and therefore the outlet 332 supplies operating power to the one or more of the smart device 510, 520, or 530, and therefore the device operates.

In step 794, the battery module 390 or converter 322 determines whether the controller is available, as above in step 760. If the answer is no, the controller is not available, then the battery module 390 or converter 322 continues to perform step 794 until the controller becomes available, or until its voltage or stored energy drop below a threshold value and the outlet 332 is deactivated.

In step 796, the BMC 184 is available, and communicates with all available battery modules 390 and/or converters 322, in order to track their usage as assets of the removable vehicle battery system 100. Such asset tracking may include, but is not limited to, locations, tool assignments, remaining energy (e.g., in kWh), operating temperature, signal strength, output voltage, and output current of each of the battery modules 390 and converters 322. In some embodiments, asset tracking may further include tracking of the same or similar parameters for smart devices 510, 520, or 530, or other smart devices including but not limited to other vehicles. In some embodiments, the asset tracking information is stored or logged in a memory (e.g., memory 170), displayed to a user through the interface engine 155, or communicated to the remote server 125. In other embodiments, the asset tracking information is employed in determining usable configurations of the system (e.g., in step 780), such that for example the controller does not instruct a user to connect battery modules 390 or converters 322 that are currently in use or that are located far from the point of intended use. After step 795 is performed, the process returns to step 750, thus forming a loop that continuously monitors whether sufficient power is available to continue operating the smart device 510, 520, or 530.

This flow diagram is provided for exemplary purposes; a person of ordinary skill in the art will recognize myriad variations that nonetheless fall within the spirit and content of the present disclosure.

Supplying portable power, backup power, or emergency power to buildings, vehicles, buildings, appliances, and power tools currently presents numerous challenges. The removable vehicle battery system advantageously provides a means for managing high-capacity storage batteries or battery modules, including safely and conveniently charging, discharging, transporting, monitoring, tracking and logging the performance of the storage batteries such that they may be used to power houses, businesses, boats, recreational vehicles, campsites, jobsites, appliances, and power tools. Because the removable vehicle battery system and the devices to be powered are able to communicate through either a wired or a wireless connection, the removable vehicle power system receives information about the status and expected power demands of the devices to which it may connect, while the devices receive information about the current availability, charge state, capacity, and capabilities of the removable vehicle power system and its components. In some embodiments, user instructions are provided as to how to connect removable vehicle power system components in order to power a given device, building, vehicle, site, or system. In some embodiments, the removable vehicle power system provides interaction between the user and the vehicle through the HU or connected device.

A number of variations are possible on the examples and embodiments described above. For example, in some embodiments, communication between a smart device and a battery module, converter, or battery management controller are conducted using a near-field communication protocol such as NFC, such that the device does not need to be powered in order to send and receive information, but rather receives sufficient RF energy from the transceiver of the battery module, converter, or BMC to enable it to supply information or respond to simple queries (e.g., via an NFC tag). The display 290 could be replaced or supplemented with audible warnings, messages, flashing lights or indicators, data, and recommendations, or with haptic feedback (e.g., steering wheel vibration). The technology described herein may be implemented on manually controlled, driverassist, or fully autonomous vehicles. The technology described herein may be implemented in diverse combinations of hardware, software, and firmware, depending on the implementation or as necessitated by the structures and modules already present in existing electric, hybrid, and plug-in hybrid vehicles.

Accordingly, the logical operations making up the embodiments of the technology described herein may be referred to variously as operations, steps, objects, elements, components, or modules. Furthermore, it should be understood that these may be arranged in any order, unless explicitly claimed otherwise or a specific order is inherently necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the removable vehicle battery system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the removable vehicle battery system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, some embodiments of the proposed system would also include removable fuel cell vehicles. Once the batteries, inverters, converters, fuel cells, etc. are finished with the current use, they can be readily reinstalled back into the vehicle. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A removable vehicle battery system comprising:
an energy storage device configured to power a first vehicle, the energy storage device comprising a first removable energy storage module comprising a store of energy;
a control unit configured to control charging and discharging of the first removable energy storage module;
a removable converter configured to convert the store of energy into a usable format for an external device;
a power outlet configured to supply energy from the store of energy to the external device in the usable format when the first removable energy storage module is removed from the first vehicle; and
a communication link between the external device and at least one of the first removable energy storage module, the removable converter, and the control unit,
wherein the communication link is configured to receive information from the external device regarding the usable format,
wherein the communication link is configured to communicate information regarding the store of energy and the usable format to the control unit, and
wherein, in response to receiving information regarding the store of energy and the usable format, the control unit controls energy delivery to the external device.

2. The system of claim 1, wherein the communication link is a wireless link comprising a direct, indirect, or ad-hoc wireless link.

3. The system of claim 2, wherein the wireless link is configured to pass through an external router, server, or network.

4. The system of claim 2, wherein the control unit is further configured to:
verify whether an arrangement of the first removable energy storage module and the removable converter can deliver the store of energy to the external device in the usable format;
instruct a user as to alternative configurations of the first removable energy storage module, removable converter, and a second removable energy storage module that are capable of delivering the store of energy to the external device in the usable format;
command internal switching between different connection types between the first removable energy storage module, second removable energy storage module, and removable converter.

5. The system of claim 1, wherein the communication link is a wired link.

6. The system of claim 1, wherein the removable energy storage module comprises the removable converter.

7. The system of claim 1, wherein the removable converter is separate from but connectable to the removable energy storage module.

8. The system of claim 1, wherein the information regarding the store of energy comprises one or more of a quantity of energy, a maximum available current, a maximum available power, or a range of available voltages.

9. The system of claim 1, wherein the information regarding the usable format comprises a at least one of a voltage requirement, a current requirement, or a power requirement.

10. The system of claim 1, wherein the power outlet is configured to supply DC power, wherein the system establishes communication with the external device to specify a voltage range to be applied through identified positive and negative DC terminals.

11. The system of claim 10, wherein the DC power comprises at least one of 5-volt or 12-volt DC power.

12. The system of claim 1, wherein the power outlet is configured to supply AC power.

13. The system of claim 12, wherein the AC power comprises at least one of 120-volt or 220-volt AC power.

14. The system of claim 12, wherein the AC power comprises at least one of single-phase or three-phase AC power.

15. The system of claim 1, wherein the control unit controls the discharging of the removable energy storage module through wireless communication.

16. The system of claim 1, wherein the external device comprises any of a second vehicle, a building, a tool, or an appliance.

17. The system of claim 1, wherein the external device comprises a plurality of tools or appliances.

18. The system of claim 1, wherein at the first energy storage module comprises a voltage of between 50 and 425 volts.

19. A method of powering an external device with a vehicle battery, comprising:
   subdividing the vehicle battery into one or more removable power modules and one or more converters;
   configuring the one or more converters to convert energy stored in the one or more removable power modules into a format usable by the external device;
   providing a communication link between the external device and at least one of the one or more converters or at least one of the one or more removable power modules;
   communicating information between the external device and at least one of the one or more converters or at least one of the one or more removable power modules; and
   in response to the communicating, supplying energy to the external device in the format usable by the external device based on whether the energy can be supplied in the format usable by the external device.

20. A removable vehicle battery system comprising:
   one or more removable energy storage modules configured to power a vehicle, each comprising a store of energy;
   one or more converters disposed within or connectable to the one or more removable energy storage modules, the converters being configured to convert one or more of the stores of energy into a format usable by an external device;
   one or more power outlets disposed on the converters, the power outlets being configured to supply energy to the external device; and
   a wireless communication link between the external device and one or more of the removable energy storage modules,
   wherein the one or more removable energy storage modules and one or more converters may be removed from the vehicle and used to power the external device, and
   wherein the wireless communication link is configured to communicate information from regarding the store of energy and the format usable by the external device,
   wherein the one or more removable energy storage modules and one or more converters provide energy to the external device based on whether the store of energy can be provided in the format usable by the external device.

* * * * *